UNITED STATES PATENT OFFICE.

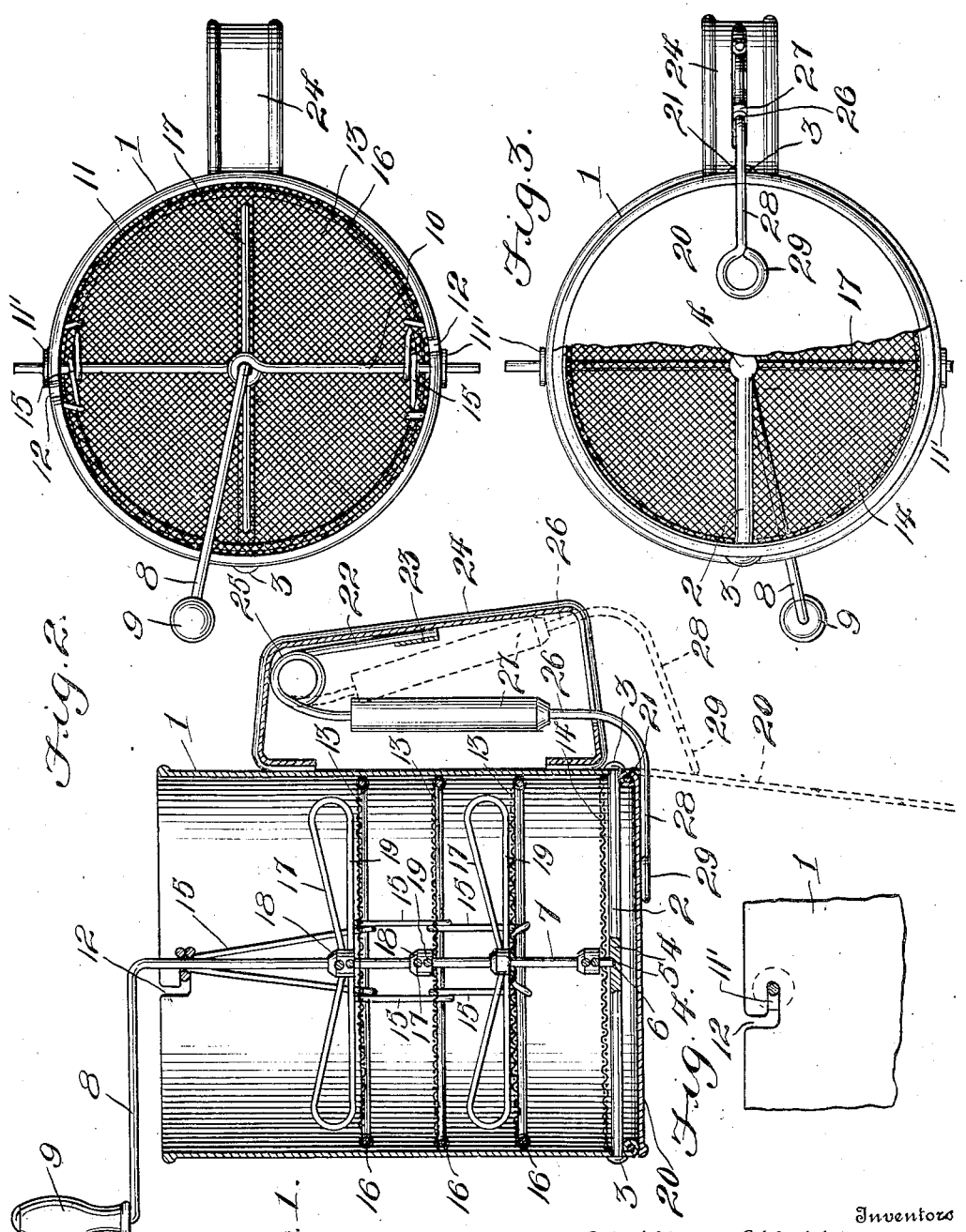

WILLIAM WILLIAMSON AND GEORGE BLUE, OF SHARPSBURG, PENNSYLVANIA.

SIEVE.

932,930.  Specification of Letters Patent.  Patented Aug. 31, 1909.

Application filed April 14, 1908. Serial No. 427,043.

*To all whom it may concern:*

Be it known that we, WILLIAM WILLIAMSON and GEORGE BLUE, citizens of the United States of America, residing at Sharpsburg, in the county of Allegheny and State of Pennsylvania, have invented new and useful Improvements in Sieves, of which the following is a specification.

This invention relates to culinary sieves, and one of the principal objects of the same is to provide a sieve in which the screens and the agitators may be entirely removed from the casing for cleaning.

Another object of the invention is to provide a sieve in which the hinged bottom may be readily opened by means of a spring handle to discharge the sifted contents of the casing.

These and other objects may be attained by means of the construction illustrated in the accompanying drawing, in which,—

Figure 1 is a central vertical section of a sieve made in accordance with the invention. Fig. 2 is a top plan view of the same. Fig. 3 is a bottom plan view with a portion of the bottom broken away to better illustrate the interior construction of the sieve. Fig. 4 is a detail side elevation and section, showing the manner of securing the top cross bar to the casing.

Referring to the drawing for a more specific description of the invention, the numeral 1 designates the casing which, as shown, is a hollow cylindrical device. Extending across the bottom of the casing is a cross bar 2, said bar being headed up, as at 3, to the casing and provided in its center with a flattened portion 4 having a conical socket 5 therein to receive the pointed lower end 6 of the vertical shaft 7 provided with a hand crank 8 at its upper end and an operating handle 9 connected to said crank. The shaft 7 is supported near its upper end by means of a cross bar 10 which is bent around the shaft 7 to form a bearing 11, the ends of said bar 10 being provided with buttons or disks 11' and said cross bar being detachably connected to the casing by means of the bayonet slots 12, as will be understood.

As shown, there are four screens 13, 14, designed to be of different degrees of fineness, the screens 13 being secured together by means of the wires 15 which extend down and around the binding wires 16 at the outer edges of said screens upon opposite sides thereof.

When it is desired to remove the screens from the casing for the purpose of cleaning the same, the cross bar 10 is moved to one side to permit the same to pass out of the bayonet slots 12 at the upper edge of the casing. By then withdrawing the shaft 7 all of the screens are removed with it.

Agitators, consisting of wire loops 17, are mounted upon the shaft 7 by means of suitable hubs 18 in which are secured the ends of the agitators 17. These agitators are provided with plain horizontal bottom strands 19 adapted to pass over the tops of the screens in close connection therewith to agitate the flour or other material being sifted and pass it quickly through the sieves. Whenever required, the shaft 7, the cross bar 10 and the sieve 13 are removable from the casing 7 to permit the same to be readily cleaned.

The bottom 20 of the sieve is connected to the casing 1 by a hinge 21, and said bottom is held closed by means of a spring support comprising a shank 22 secured in a keeper 23 in the handle 24. The shank 22 extends upwardly and is formed into a coil 25 from whence the wire strand is bent downwardly, as at 26, and a wooden handle 27 is placed thereon. The strand 26 extends through the bottom of the handle 24 and is bent at right angles, as at 28, and is provided with a terminal loop 29. When it is desired to discharge the contents of the sieve the wooden handle 27 is grasped and moved to the dotted line position, when the bottom 20 of the sieve will drop to the position shown in dotted lines in Fig. 1, thus permitting the sifted material to be discharged.

The invention is of simple construction, is easy to clean, will operate quickly and can be manufactured at slight cost.

Having thus described the invention, what is claimed as new, is:—

The herein described sieve comprising a casing, a series of screens therein, a shaft extending through the screens, a series of agitators secured to said shaft and bearing upon the upper surface of said screens, means whereby said screens, agitators and shafts may be disconnected from the casing for removal, a bottom hinged to the casing, a handle connected to the casing adjacent to the hinge, and a spring supporter for normally holding said bottom closed, said supporter comprising a spring having one of its ends attached inside to said handle and provided with an arm extending underneath the bottom of the sieve.

In testimony whereof we affix our signatures in presence of two witnesses.

WILLIAM WILLIAMSON.
GEORGE BLUE.

Witnesses:
ISAAC TOMUS,
FRANK MURPHY.